United States Patent [19]

Morey

[11] 3,957,637
[45] May 18, 1976

[54] FILTRATION SYSTEM AND FLOW CONTROL METHOD THEREFOR

[75] Inventor: Edward F. Morey, Atlanta, Ga.

[73] Assignee: The Taulman Company, Atlanta, Ga.

[22] Filed: Aug. 23, 1974

[21] Appl. No.: 500,103

[52] U.S. Cl. .............................. 210/73 R; 210/103; 210/137; 210/138
[51] Int. Cl.² ........................................ B01D 23/26
[58] Field of Search ............ 210/73, 103, 104, 137, 210/101, 106, 108, 138

[56] References Cited
UNITED STATES PATENTS

| | | | |
|---|---|---|---|
| 2,469,293 | 3/1949 | Davidson | 210/137 X |
| 3,279,604 | 10/1966 | Leviel | 210/137 X |
| 3,410,409 | 11/1968 | Rittenhouse et al. | 210/137 X |
| 3,478,883 | 11/1969 | Deluca, Jr. | 210/108 |
| 3,485,369 | 12/1969 | Voorheis | 210/137 X |
| 3,631,982 | 1/1972 | Ledeune | 210/137 X |

*Primary Examiner*—John Adee
*Attorney, Agent, or Firm*—Berman, Aisenberg & Platt

[57] ABSTRACT

A method and apparatus for controlling the operation of gravity or pressure filters in a filtration system. A bank of filter beds are provided for removing suspended solids from the fluid medium which are fed to the filters via a common inlet conduit. Each of the filters has an associated effluent conduit which, in turn, has a throttling device positioned therein controlling the rate of flow of the fluid medium through the respective filter. A differential pressure transmitter is provided for each filter bed to measure the differential fluid pressure thereacross and to provide an output analog signal proportional thereto. A control device generates a control signal in response to the output from the differential pressure transmitter and a set point signal representing the desired differential pressure. The control signal is utilized to vary the throttling device in the effluent conduit and, consequently, to bring the measured differential pressure across the filter bed in line with the desired differential pressure. A common set point signal is provided for the entire bank of filters by means of a level or pressure sensor positioned in the common inlet conduit. In this manner, each filter operates at a different flow rate but at the same differential pressure across the filter and responds to both varying influent flows and effluent flows so as to minimize the differential pressure loss thereacross.

18 Claims, 2 Drawing Figures

FILTRATION SYSTEM AND FLOW CONTROL METHOD THEREFOR

BACKGROUND OF THE INVENTION

1. Field of the Invention

The present invention is related to a filtration system and, more particularly, to a method and apparatus for controlling the operation of gravity or pressure filters for the removal of suspended material therefrom in water and waste water treatment plants.

2. Description of the Prior Art

Water and waste water treatment processes include flow sheets which incorporate pre-treatment steps which involve, in the case of water treatment, coagulation, flocculation, and sedimentation. In cases involving waste water treatment, the pre-treatment phase may involve biological or chemical treatment or a combination thereof. In either event, the water or waste water from the preliminary pre-treatment processes contains carryover suspended material which must be removed prior to use. The process utilized for the removal of the carryover suspended material is known in the art as filtration. Filtration processes involve passing the water or waste water through a porous bed of granular material which is composed of graded layers of materials having varying sizes and densities. Filters have been constructed of, for example, silica sand, anthracite, garnet, illmenite, or other suitable material. Current practice is to construct such filters from a combination of different materials having varying particle size and density so that the material, when subjected to an upward flow of water during a backwash, will grade itself in reverse order with the largest diameter, lowest specific gravity material on the top of the bed and the finest and highest specific gravity material on the bottom. Such filters are further generally classified as being of the gravity type or the pressure type.

As the water passes through the filter, the suspended material is removed by virtue of its attachment to the grains of the filter material. Beginning with a relatively clean filter, very little resistance to flow is offered by the granular filter material. However, as the water continues to pass through the filter, the suspended material is gradually removed tending to fill the voids between the grains, thereby gradually increasing the flow resistance. After a certain period of operation, known as a run, the filter will have removed sufficient suspended material to fill up all available voids. At this point, very little flow will pass through the filter due to the high resistance created by the clogged filter bed. The filter is then backwashed by reversing the flow upwards through the filter, expanding the filter bed due to the upward velocity, and washing the entrapped suspended material away to drain. At the completion of a backwash operation, the relatively clean filter is placed back in service and the foregoing cycle is repeated.

Since the filter bed creates a varying resistance to flow during each cycle, it is generally necessary to provide a system for controlling the flow of water through the filter. One prior art technique, known as constant rate control, utilizes a flow sensing device and a flow throttling device installed in the effluent pipe from the filter. Control instrumentation is provided which compares a flow signal from the flow sensing device with another signal representing the desired flow. The output signal from the comparator-controller regulates the flow throttling device to bring the flow rate into balance with the desired or set rate. In such a device, the flow through the filter is controlled at a fixed or constant rate, independently of the effect of the variable resistance offered by the filter bed.

Another prior art technique, known in the art as constant level control, causes the filter to accept all water that flows thereto. In this technique, water enters the filter over a weir. When multiple filters are utilized, the influent weirs serve to divide the flow of water equally among all filters. A level sensing device installed in each filter provides an output signal which is utilized to regulate a throttling device installed in the effluent pipe from the filter so as to maintain the water level in the filter at a fixed point just below the level of the influent weir. In this technique, the water flow through the filter always equals the flow into the filter over the weir, regardless of the variable resistance offered by the filter bed.

Another prior art technique, known as the declining rate or variable declining rate method, is normally used with several filters operating in parallel in which a common influent and effluent header is provided for all filters. Pressure in the common influent header is raised or lowered to vary the flow through all filters. Influent connections into each filter are below the water surface to thereby create a common water level in all filters. The water level in the filters then assumes a level required to provide sufficient head pressure to produce the flow called for by the pressure in the common effluent header. A fixed restriction, such as an orifice, is built into the effluent pipe from each filter such that no filter, when clean after backwashing, will take an undue share of the total load. This technique, as exemplified by U.S. Pat. No. 3,771,655, is considered by those skilled in the art to be a very efficient method of control of the filtration process since it utilizes the cleanest filter to pass the most flow.

OBJECTS AND SUMMARY OF THE INVENTION

A primary object of the present invention is to provide a novel and unique system and method for controlling the flow of water through gravity or pressure filters for the removal of suspended material from water and waste water in treatment plants.

Another object of the present invention is to provide a novel and unique system for controlling the flow of a fluid medium through a plurality of filters provided for removing suspended solids from the fluid medium which incorporate the advantages of the declining rate method of flow control with the added advantages of fixed level operation without the concomitant disadvantages of the constant rate or constant level flow control techniques.

A still further object of the present invention is to provide in a system for controlling the flow of a fluid medium through a plurality of filter means for ensuring that the total flow produced by all filters is equal to the total flow being applied to the filters from the secondary treatment effluent.

An additional object of the present invention is to provide a process for controlling the flow of water or waste water through a filtration system which takes into account variations in flow in both the influent and effluent conduits.

A still further object of the present invention is to provide in a flow control method for a filtration system means for automatically limiting the differential pressure across individual filter beds so as not to exceed a predetermined maximum during a portion of the filter cycle.

An additional object of the present invention is to provide a system for controlling fluid flow through a plurality of filters in which the filters operate at individually different flow rates so as to produce the least differential pressure loss across the filter bed.

The foregoing and other objects are achieved in accordance with one aspect of the present invention through the provision of a system for controlling the flow of a fluid medium through a plurality of filters provided for removing suspended solids from the fluid medium. The system includes a common inlet conduit for all filters for directing the fluid medium therethrough from the secondary treatment effluent. Each of the filters includes an effluent conduit for removing the filtered fluid medium from the respective bed. Means are provided with each filter bed for measuring the differential fluid pressure thereacross and for producing an output analog signal proportional thereto. The output analog signal is compared with a set point signal indicative of the desired differential fluid pressure across the individual filter bed. The output from the comparator means is utilized to actuate a throttling device positioned in the individual filter's effluent conduit to vary the respective flow through such filter until the measured differential fluid pressure thereacross corresponds to the desired differential pressure. Means are further provided in the common inlet conduit for measuring the fluid pressure or level therein and producing in response thereto a common set point signal for the entire system. The automatically set common set point signal operates to adjust the flow through the individual filters until the total flow through all filters equals the total influent flow. Variation in influent as well as effluent flow due to filter bed clogging are taken into account. In accordance with a further aspect of the present invention, means are provided for limiting during clean filter operation the differential pressure across the individual filters so as not to exceed a predetermined maximum value. It will be understood that the variable being controlled is the differential pressure across the filters and not flow as in the prior art systems.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
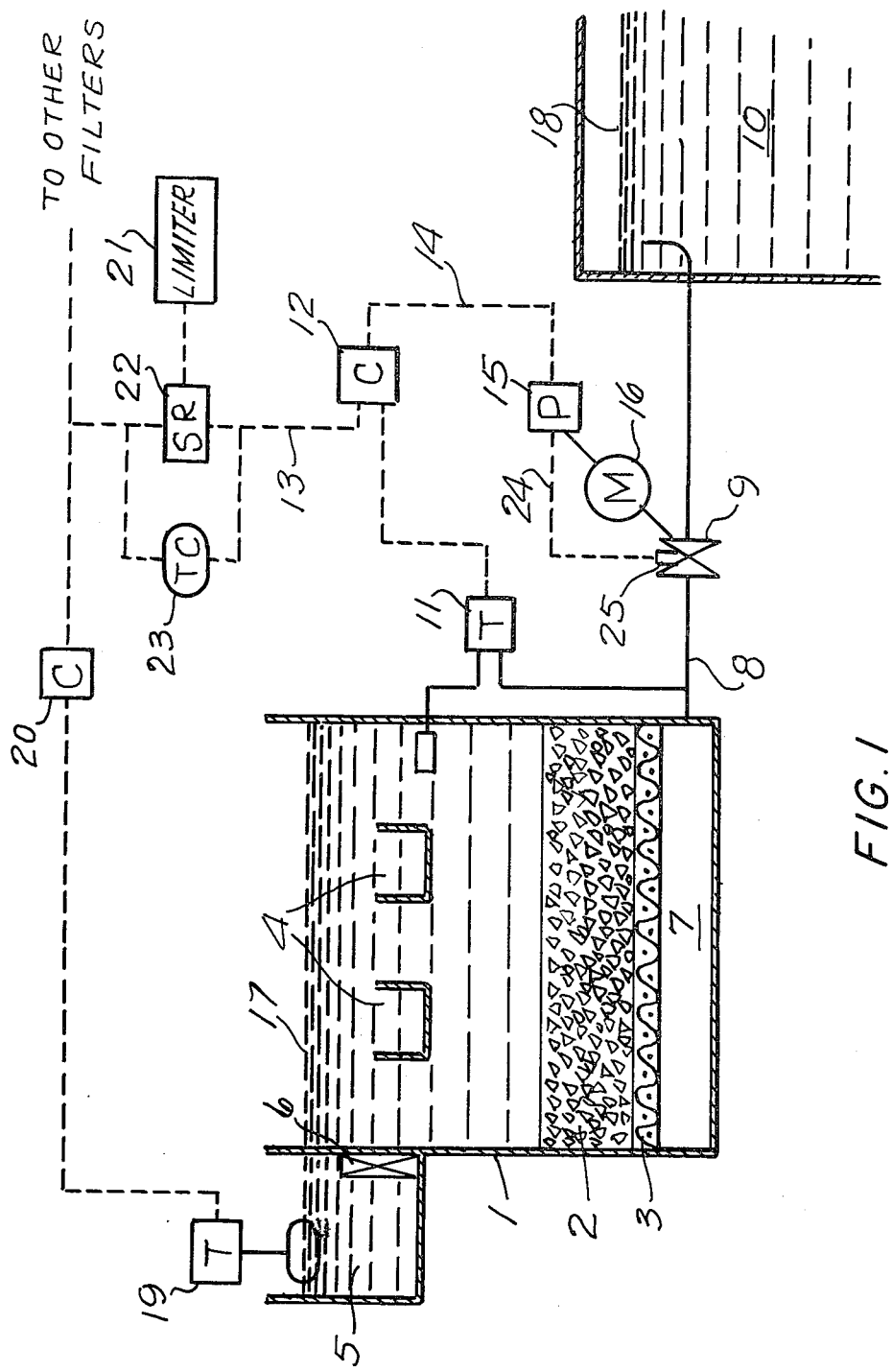
FIG. 1 is a schematic diagram of the preferred embodiment of a filtration system incorporating the flow control technique according to the present invention as applied to a single filter bed.

Referring to the FIG. 1, the filtration system embodying the present invention is schematically shown as comprising a filter bed 1 which contains granular filter media 2 and is supported by an underdrain or strainer system 3. Although only one filter bed and associated control apparatus are shown in the figure, it is understood that a typical plant installation includes a plurality of similarly configured filter beds and associated control apparatus, as will become more clear hereinafter.

A typical configuration for media bed 2 consists of several layers of granular materials of varying sizes and specific gravity. For example, filter bed 1 may comprise the "Uniform Dual Media" bed manufactured by the Turbitrol Company which consists of a top layer of graded anthracite coal approximately 20 inches deep. The anthracite coal particles, having a specific gravity of approximately 1.6, range in particle size from 1.0 to 1.4 millimeters. The second layer comprises silica sand approximately 10 inches deep having a particle size range of 0.42 to 0.46 millimeters. The bottom layers consist of graded support gravel to a depth of 10 to 12 inches with particle sizes ranging from No. 16 mesh to 1 inch. The specific gravity of the silica sand and gravel is approximately 2.6. Other examples of a suitable filter media 2 include dual medias having different bed depths and particle size; three media beds incorporating media of three different specific gravities; and single media beds incorporating granular media layers of the same specific gravity.

The underdrain or strainer system 3 may typically comprise what is known in the art as the Wheeler system which consists of a concrete slab which contains a series of inverted pyramidal depressions, the space therebetween at the bottom thereof defining a plurality of orifices through which the fluid communicates from the filter media 2 to the underdrain collector chamber 7. Each depression contains a series of ceramic spheres arranged in a regular pattern so as to provide a uniform, permeable surface to support the lower layers of filter media.

Wash water troughs 4 are provided within the filter 1 to skim off and remove backwash water during the filter washing cycle. Water from the pre-treatment process flows through an inlet flume or conduit 5 which is common to all the filters in the bank or group. Water flows from the inlet conduit 5 into the filter 1 through an inlet valve or gate 6 which may comprise, for example, a standard gate valve, butterfly valve, sluice gate, or slide gate. The valve or gate 6 may be designed for either manual operation by means of hand wheels or automatic operation by means of power devices such as electric motors, hydraulic cylinders, pneumatic cylinders, or the like.

Figure 2:
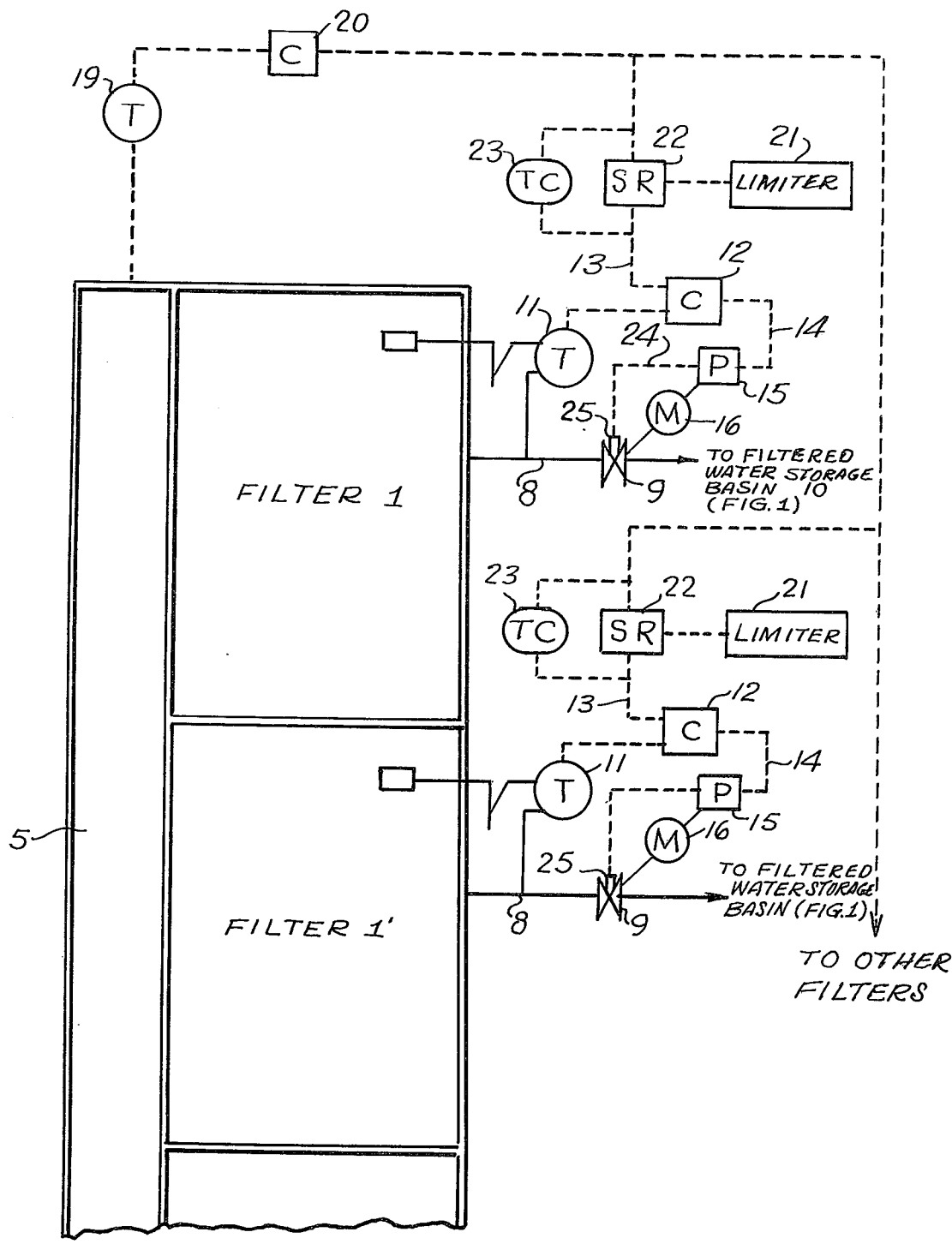
FIG. 2 is a schematic diagram of the preferred embodiment of a filtration system incorporating the flow control technique according to the present invention as applied to a plurality of filter beds.

Turning now to FIG. 2 as well as FIG. 1, it will be understood that the present invention is designed to control the operation of a plurality of filter beds such as 1 and 1' fed from a common inlet flume 5 as shown in FIG. 2. Each filter bed has associated with it, identical control elements, designated by like reference numerals, as shown in FIG. 2, for a purpose which will be fully explained below. Each of the filter beds is identical in construction to filter bed 1, described above in connection with FIG. 1. It will be understood that in the following explanation, whenever filter bed 1 is referred to, the explanation applies equally well to filter bed 1' and its associated control elements, as well as to any other filter beds, the present invention not being limited to any particular number of filter beds.

Connected to the underdrain collector chamber 7 is an effluent pipe or conduit 8 which conducts the filtered water through an effluent control or throttling device 9 into a filtered water collection or storage basin 10. Common devices which may be utilized as the effluent control or throttling device 9 include butterfly valves, plug valves, globe valves and gate valves. The valve selected for throttling device 9 is preferably positionable in any position from fully open to fully closed to enable varying degrees of restriction to be applied to the flow of fluid therethrough. Associated with throttling device 9 is a position transmitter 25 which transmits a signal proportional to the position of throttle 9 to a position control device 15 via line 24 for a purpose to be described in more detail hereinafter.

As water flows through the granular media 2 of filter bed 1, a pressure loss or differential is created due to the restriction presented by the granular media bed 2. The magnitude of the differential pressure loss depends upon both the amount of flow and the degree of cleanliness or porosity of the filter bed 2. A differential pressure transmitter 11 is connected between a point above media bed 2 and effluent conduit 8 for measuring the differential pressure thereacross. Differential pressure transmitter 11 also produces an output analog signal which is proportional to the measured differential pressure. A suitable differential pressure transmitter for use in connection with the present invention consists of a differential pressure bellows assembly to which the two input pressures are applied. The two pressures, assuming they are not equal, cause movement of the bellows assembly which acts against a range spring until the force of the compressed spring counterbalances the net unbalanced forces caused by the applied pressures. The movement of the bellows may be applied, for example, to a differential transformer having well-known electronic circuitry for producing a voltage or current having a magnitude proportional to the difference of the applied pressures. Other devices suitable for use as differential pressure transmitter 11 may incorporate pneumatic signal, hydraulic signal, or mechanical signal transmission, all of which are well known in the art.

The output analog signal proportional to the measured pressure differential is fed from differential pressure transmitter 11 to one input of a controller 12. Controller 12 operates to compare the magnitude of the analog signal from differential pressure transmitter 11 with a second signal received from line 13 which represents the desired or set point value of differential pressure. The set point value of differential pressure received at the second input 13 of controller 12 may be set either by manual means or by an automatic means to be described in more detail hereinafter. The controller 12, which may comprise any of a number of well-known electronic, pneumatic, hydraulic, or mechanical devices, compares the value of the two input signals to see if they are equal. If so, the output signal level of controller 12 at line 14 remains constant. However, if the two input signals are not equal, the output signal of controller 12 will either increase or decrease depending on whether the differential pressure signal from transmitter 11 is respectively above or below the set point signal at line 13. In, for example, an electronic embodiment, controller 12 may comprise a well-known differential amplifier which receives the two input signals and outputs an electronic signal whose magnitude and polarity represent both the direction and magnitude of the difference between the two inputs.

Means for generating the set point signal representing desired differential pressure across filter bed 1 may, for example in an electronic embodiment, comprise a manually adjustable potentiometer and power supply which is suitably sized so as to produce a voltage or current signal the duration and magnitude of which matches the output characteristics of the differential pressure transmitter 11. If pneumatic or hydraulic instrumentation is utilized, a manual set point generator would comprise special regulators or reducers which operate with a fixed inlet pressure. Further and in accordance with the principles of the present invention, the set point signal input at line 13 to controller 12 may be automatically generated and limited in a manner to be described in more detail hereinafter.

The output signal from the controller 12 is connected via line 14 to one input of a position controller 15 which, in turn, controls an actuating device 16 which, in turn, operates the effluent throttling device 9. The function of position controller 15 is somewhat similar to that of controller 12. Position controller 15 accepts two input signals, one via line 24 from position transmitter 25 on throttling device 9, and one from the output of controller 12 via line 14. Position controller 15 develops an output signal which is fed to actuating device 16 which represents the difference between the actual position of throttling device 9 and the difference signal produced by the output of controller 12.

Actuating device 16 may comprise either an electric motor having a gear train connected to the control portion of throttling device 9, or a pneumatic or hydraulic cylinder, all of which are well known in the art. In an electrical embodiment, the output signal from position controller 15 controls the power supply to electric motor 16, the motor speed being proportional to the magnitude of the difference signal developed therefrom.

If the signal from position controller 15 is such as to cause actuating device 16 to close throttling device 9, the flow through the filter bed 1 will decrease, thereby causing the pressure differential thereacross to also decrease since less differential is required to cause flow at the lower rate. Conversely, should the throttling device 9 be opened, the flow through the filter bed 2 will increase, thereby causing the pressure differential thereacross to increase. It is apparent that the total available pressure to cause flow through the filter 1 is the difference between the pressure on the water level 17 in filter 1 and the pressure at the water level 18 in the filtered water storage basin 10. The sum of the differential pressure across filter bed 1, plus the pressure loss across the throttling device 9, plus the pipe line losses must always equal this total available pressure. Accordingly, during a normal filtering run, it is apparent that with a fixed set point value being applied to controller 12, the throttling device 9 will gradually open as the filter bed 2 continues to remove suspended material from the water flowing therethrough.

In plant scale operation, it is extremely desirable that the total flow produced by all filters in the filter bank be equal to the total flow being applied to the filters from the preliminary treatment step. In accordance with the present invention, means are provided to equalize the flow by automatically producing a common differential pressure set point signal for all filters. The foregoing is achieved by means of a level or pressure transmitter 19 which senses the level or pressure of water in the influent conduit 5. Transmitter 19 may incorporate electronic, pneumatic, hydraulic or mechanical signal producing means identical to those described above for the differential pressure transmitter 11. Transmitter 19 is designed to produce an analog signal proportional to a preset variation in water level or pressure in the inlet flume or conduit 5. The input signal to transmitter 19, rather than being two pressures as in the case of transmitter 11, is either a single pressure or a mechanical float position which represents the pressure or level respectively in the inlet conduit 5. Transmitter 19 is preferably calibrated such that its output analog signal varies from minimum to maximum over the desired range of change in pressure or level in conduit 5. A typical range in the case of level-sensing the fluid in conduit 5 for gravity filters would be from 6 to 12 inches. A pressure transmitter, utilized in the case of pressure filters, would sense a typical range of from approximately 5 to 30 psi.

The output signal from transmitter 19 is applied to a proportional signal relay 20 which is utilized to ratio the output signal from transmitter 19 so as to permit adjustment in the range of level change in the influent conduit 5 that is required to produce full-scale change in the signal output. In other words, in order to provide greater system flexibility, the input range of the level/pressure transmitter 19 is set greater than the anticipated optimum generating range. Proportional signal relay 20 is designed to accept a portion of the output signal from transmitter 19 representing the desired operating range. Relay 20 produces a proportional output signal of the same span as the full range of the transmitter 19, the net effect being the same as changing the input calibration of transmitter 19. The output signal from proportional signal relay 20 is applied as the set point signal along line 13 to the differential pressure controller 12 of each filter unit being controlled in the bank.

The operation of the aforedescribed automatic set rate system will now be explained by considering the effect of flow variations in a gravity-type filter system. Assuming that the system is in balance with the total effluent from all filters being equal to the influent flow from the secondary process, a constant water level will be present in the inlet flume or conduit 5. The output signal from level transmitter 19 and signal relay 20 will be proportional to the constant level. The differential pressure controller 12 at each filter will produce an output signal to position the effluent throttling device 9 in each filter to produce a flow through each filter bed required to produce a differential pressure equal to that called for by the common set point signal. With flows in balance, any change in influent flow will cause a change in the level of the water surface in the influent conduit 5 which, in turn, causes a change in the output signal of level transmitter 19. If, for example, water level change is due to an increase in influent flow, the water level in inlet conduit 5 will rise, thereby causing the output signal from level transmitter 19 to increase the set point signal along line 13 to the differential pressure controllers 12 on each filter. Since the set point signal along line 13 will now be greater than the output signal from the differential pressure transmitters 11, the output signal along line 14 from controller 12 will increase, thereby opening the throttling device 9 so that flow through the filter bed 2 will increase so as to produce a differential pressure thereacross equal to that called for by the set point signal. The foregoing process will continue until the total flow through all filters in the bank just equals the influent flow. At that point, the water level in the influent conduit 5 will again be stabilized and the output from level transmitter 19 will be constant. As can be appreciated by one of ordinary skill in the art, reaction of the system to a decrease in influent flow will be the reverse of that just described.

A similar effect is caused by decreases in the filter effluent flow in effluent conduit 8 caused by clogging of the filter bed 2 due to the continued removal of suspended matter. Similarly, an imbalance in flows causes an increase in the water level in the influent conduit 5, thereby causing an increase in the set point signal and consequent opening of the effluent throttling device 9 so as to produce the same flow at a greater filter bed differential pressure due to bed clogging.

With the above-described system, since a clean filter bed immediately after washing may offer very little restriction at higher set point values, it may tend to want to pass undue amounts of water. In order to prevent this, the present invention incorporates means for limiting the set point signal applied to controller 12. This means essentially consists of a manual fixed rate set device 21, a selector relay 22, and a timing device 23. The manual fixed rate set device 21 is utilized to produce a set signal which corresponds to the differential pressure that would occur through a clean filter bed at the maximum desired flow rate. The value of this set point signal may be determined experimentally from, for example, a pilot filter column incorporating filter beds with granular layers identical to the bed used in the full-sized filter 2. The output signal from fixed rate set device 21, representing the limiting set point signal, is applied to a selector relay 22 which is interposed between proportional signal relay 20 and controller 12. Selector relay 22 is designed to continuously compare the magnitudes of the set point signal from the manual set point device 21 with the output from proportional signal relay 20 which represents the master set point signal. The relay 22 permits the lower of the two values to be applied as the set point signal to the input 13 of differential pressure controller 12. Selector relay 22 may be designed to operate with electronic voltage or current signals, pneumatic signals, or hydraulic signals. Since the lower of the two inputs will be fed through selector relay 22 to controller 12, the differential pressure developed across the filter bed 2 will never exceed the limiting value as long as selector relay 22 is in circuit.

Assuming a clean filter has just been put in service, suspended material begins to accumulate thereby causing a buildup of the differential pressure across the bed. After a certain period of time, which may be determined experimentally, sufficient accumulation of the suspended material will have occurred in the filter bed 2 such that the limiting action as aforedescribed will no longer be required. Accordingly, a timing device 23 may be provided such that after an adjustable pre-set interval after filter washing, the selector relay 22 and rate limiting device 21 will be removed from circuit such that the master set point signal from signal relay 20 will be continuously passed as the set point signal to the input 13 of differential pressure controller 12. The end of a normal filter cycle may be detected by means of a limit switch on the effluent throttling device 9. This switch is designed to close when the throttling device 9 is fully open and, after being closed for an adjustable period of time, indicates that the filter requires backwashing.

By way of example, the timing device 23 may comprise a standard electric motor-driven or electronic device, preferably adjustable over a range of at least 4 hours, with an automatic reset feature. Upon receiving an initial signal from the limit switch on the effluent throttling device 9, the timer 23 enters its timing cycle. At the expiration of its adjustable time interval, a contact closure occurs. In an electronic embodiment, this contact bypasses selector relay 22 directly. In a pneumatic or hydraulic embodiment, the contact, in conjunction with solenoid valves, also bypasses relay 22. After completion of the filter cycle and after backwashing, the timer sequence may be automatically reset. The selector relay 22 would again be back in the rate set circuit until the expiration of the preset adjustable time interval.

It is seen by virtue of the foregoing that I have provided a novel and unique method of controlling the flow of a fluid medium through a plurality of filter beds. At all times, the filters operate at individually different flow rates so as to produce the least differential pressure loss across the filter bed. All filters operate at the same differential pressure across the filter bed and the flow rate through the filter is not used as a process variable. No permanent restriction is required in the filter effluent line as is the case with conventional declining rate techniques. The cleanest filter amongst the bank of filters is always utilized to produce the most flow. Any filter unit removed from service for washing is the one that was producing the least flow, to minimize any upset in operation to the remaining filters in the bank.

Obviously, numerous modifications and variations of the present invention are possible in light of the above teachings. It is apparent to one ordinarily skilled in the art that the technique and system of the present invention are equally applicable to both pressure and gravity filter operations. It is therefore to be understood that within the scope of the appended claims the invention may be practiced otherwise than as specifically described herein.

What is claimed as new and desired to be secured by Letters Patent of the United States is:

1. A system for controlling the flow of a fluid medium through a plurality of filters provided for removing suspended solids from said fluid medium, which comprises:
    an inlet conduit common to said plurality of filters for directing said fluid medium thereto;
    each of said filters having an effluent conduit for receiving filtered fluid medium therefrom, means connected across each of said filters for measuring the differential fluid pressure across each of said filters and for providing an output signal proportional thereto, means for providing a common set point signal for each of said filters indicative of the desired differential fluid pressure across each of said filters, and means responsive to said output signal and said set point signal for varying the differential fluid pressure across each of said filters until the differential pressure across each of said filters corresponds to said desired differential pressure.

2. The system according to claim 1, wherein said means for producing a common set point signal for said plurality of filters comprises means positioned in said inlet conduit for producing a signal proportional to the fluid level therein.

3. Th system according to claim 1, wherein said means for producing a common set point signal for said plurality of filters comprises means positioned in said inlet conduit for producing a signal proportional to the fluid pressure therein.

4. The system according to claim 2, wherein said common set point signal producing means further includes a proportional signal relay which receives the output signal from said fluid level signal producing means and provides an output signal proportional thereto.

5. The system according to claim 2, wherein said means responsive to said output signal and said set point signal includes throttling means positioned in said effluent conduit for providing a variable fluid flow therethrough in accordance with the difference between said output signal and said set point signal.

6. The system according to claim 5, wherein said means responsive to said output signal and said set point signal further comprises controller means for producing a difference signal whose magnitude is proportional to the difference between said output signal and said set point signal.

7. The system according to claim 6, wherein said means responsive to said output signal and said set point signal further comprises position control means, means connected to said position control means for actuating said throttling means, and position sensing means connected to said throttling means for producing a position signal proportional to the position thereof, said position control means responsive to said position signal and said difference signal for providing a control signal to said actuating means.

8. The system according to claim 1, further comprising means for limiting the differential pressure across said filter so as not to exceed a predetermined maximum.

9. The system according to claim 8, wherein said limiting means comprises means for producing a set signal corresponding to said predetermined maximum, and relay means connected to receive as inputs said set signal and said common set point signal and for delivering as said set point signal to said controller means the lower of said inputs.

10. The system according to claim 9, wherein said limiting means further comprises timing means for disconnecting said limiting means after a predetermined time interval such that said common set point signal will be delivered to said controller means.

11. In a system for filtering suspended solids from a fluid medium by passing same through a plurality of filters having a common inlet conduit and each having an effluent conduit for receiving filtered fluid medium, a method for controlling the flow of said fluid medium through said plurality of filters, which comprises the steps of:
    providing a common signal indicative of a desired differential pressure to each of said plurality of filters;
    measuring the differential fluid pressure across each of said filters;
    comparing said measured differential fluid pressure with the desired differential fluid pressure for each of said filters; and
    varying the differential fluid pressure across each of said filters in proportion to the compared difference between said measured and desired fluid pressure differentials.

12. The method according to claim 11, wherein said step of varying the differential fluid pressure across each of said filters includes the step of throttling the flow of fluid through the respective effluent conduits.

13. The method according to claim 12, wherein said step of providing a common differential fluid pressure signal includes the steps of sensing the level of said fluid medium in said common inlet conduit and producing said common signal in proportion thereto.

14. The method according to claim 13, further comprising the step of limiting said common signal to a predetermined value for a predetermined length of time for each of said plurality of filters.

15. The method according to claim 12, wherein said step of providing a common differential fluid pressure signal includes the steps of sensing the pressure of said fluid medium in said common inlet conduit and producing said common signal in proportion thereto.

16. A filtration system for removing suspended solids from a fluid medium, which comprises:
 filter means through which said fluid medium is passed for removing said suspended solids therefrom;
 influent conduit means for directing said fluid medium to said filter means;
 effluent conduit means for receiving said filtered fluid medium from said filter means;
 means connected across said filter means for producing a first signal proportional to the differential pressure across said filter means;
 means for providing a second signal indicative of the desired differential pressure across said filter means; and
 throttling means positioned in said effluent conduit responsive to said first and second signals for varying the amount of fluid medium flowing through said filter means, so as to produce said desired differential pressure across said filter means.

17. The system according to claim 16, wherein said means responsive to said first and second signals further comprises controller means for producing an output signal whose magnitude is proportional to the difference between said first and second signals.

18. The system according to claim 17, wherein said means responsive to said first and second signals further comprises position control means, means connected to said position control means for actuating said throttling means, and position transmitting means connected to said throttling means for producing a third signal indicative of the position thereof, said position control means responsive to said third signal from said throttling means and said output signal from said controller means for providing a control signal to said actuating means.

* * * * *